United States Patent
Myers

[15] 3,687,290
[45] Aug. 29, 1972

[54] PNEUMATIC CONTROL SYSTEM AND TEMPERATURE RESPONSIVE VALVE CONSTRUCTION THEREFOR OR THE LIKE

[72] Inventor: Ned Myers, Elkhart, Ind.
[73] Assignee: Robertshaw Controls Company, Richmond, Va.
[22] Filed: Dec. 30, 1970
[21] Appl. No.: 102,947

Related U.S. Application Data

[63] Continuation of Ser. No. 810,316, March 25, 1969, abandoned.

[52] U.S. Cl. ............... 210/149, 137/468, 210/430, 210/432
[51] Int. Cl. ........................................... B01d 35/14
[58] Field of Search .............. 210/149, 429–432; 137/468; 53/29, 208, 217

[56] References Cited

UNITED STATES PATENTS

| | | |
|---|---|---|
| 1,564,504 | 12/1925 | Woolson ............... 137/468 X |
| 2,118,299 | 5/1938 | Ellis ..................... 137/468 X |
| 2,271,850 | 2/1942 | Zinkil ................... 137/460 X |
| 2,161,679 | 6/1939 | Kuenhold ............. 210/149 X |
| 2,563,042 | 8/1951 | Jaubert ................. 55/208 X |
| 2,917,067 | 12/1959 | Pearl .................... 137/468 X |
| 3,135,495 | 6/1964 | Ferris ................... 210/430 X |
| 3,279,151 | 10/1966 | Kauerdimi et al. .... 55/208 X |
| 3,417,768 | 12/1968 | Wasson ................ 137/468 X |

Primary Examiner—John Adee
Attorney—Candor, Candor & Tassone

[57] ABSTRACT

A temperature responsive valve construction having a housing means provided with an inlet and an outlet formed therein and being separated by a valve seat, a bimetal snap disc being carried by the housing means and disposed on one side of the valve seat so that the snap disc closes the valve seat when the same senses a certain temperature and opens the valve seat when sensing another temperature.

14 Claims, 4 Drawing Figures

PATENTED AUG 29 1972 3,687,290

INVENTOR.
NED MYERS

BY

Cauda, Cauda & Tausone

HIS ATTORNEYS

PNEUMATIC CONTROL SYSTEM AND TEMPERATURE RESPONSIVE VALVE CONSTRUCTION THEREFOR OR THE LIKE

This application is a continuation application of its copending parent application, Ser. No. 810,316, filed Mar. 25, 1969, and now abandoned in favor of this continuation application.

This invention relates to an improved pneumatic control system as well as to an improved temperature responsive valve construction for such a control system or the like.

It is well known from the copending patent application, Ser. No. 717,586, filed Apr. 1, 1968, now U.S. Pat. No. 3,522,661, that a pneumatic control system can be provided wherein a pneumatic source is interconnected to a pneumatically operated device by a passage defining means with such passage defining means having a temperature responsive valve construction therein which closes the passage means between the source and the pneumatically operated device when the temperature responsive valve senses a certain condition an opens the passage means between the source and the pneumatically operated device when the temperature responsive valve means senses another temperature condition.

It is a feature of this invention to provide an improved temperature responsive valve construction for such a system or the like.

In particular, one embodiment of this invention provides a temperature responsive valve construction having a housing means provided with an inlet and an outlet formed therein and being separated by a valve seat. A bimetallic snap disc is carried by the housing means and is disposed on one side of the valve seat, the snap disc being so constructed and arranged that the same will close the valve seat when sensing a certain temperature condition and will open the valve seat when sensing another temperature condition.

Accordingly, it is an object of this invention to provide an improved temperature responsive valve construction having one or more of the novel features set forth above or hereinafter shown or described.

Another object of this invention is to provide an improved control system utilizing such a temperature responsive valve construction or the like.

Other objects, uses and advantages of this invention are apparent from a reading of this description, which proceeds with reference to the accompanying drawings forming a part thereof and wherein.

Figure 1:
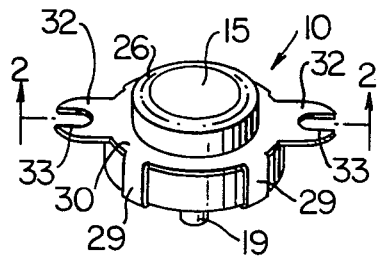
FIG. 1 is a top perspective view of the improved temperature responsive valve construction of this invention.

While the various features of this invention are hereinafter described and illustrated as being particularly adaptable to provide a temperature responsive valve construction means for a pneumatic control system, it is to be understood that the various features of this invention may be utilized singly or in any combination thereof to provide control means for other systems as desired.

Therefore, this invention is not to be limited to only the embodiment illustrated in the drawings, because the drawings are merely utilized to illustrate one of wide variety of uses of this invention.

Referring now to FIGS. 1–4, the improved temperature responsive valve construction of this invention is generally indicated by the reference numeral 10 and comprises a housing means 11 formed from a substantially cup-shaped housing member 12 having an open end 13 and a closed end 14 and cooperating with a bracket or cover member 15 to define a chamber 16 therebetween, the cover member 15 closing the open end of the cup-shaped member 12.

The cup-shaped housing member 12 has an inlet 17 and an outlet 18 formed in the closed end 14 thereof with the inlet 17 and outlet 18 respectively being disposed in fluid communication with the chamber 16 of the valve construction 10, the inlet 18 being formed as a passage means passing through opposed integral nipple extensions 19 and 20 projecting in opposite directions from the closed end 14 of the cup-shaped housing member 12. A resilient tubular valve seat member 21 is disposed about the nipple extension 20 and has a free end 22 disposed beyond the free end 23 of the nipple extension 20 so that the free end 22 of the resilient member 21 forms a valve seat for separating the inlet 17 from the outlet 18 of the valve construction 10. If desired, the free end 22 of the resilient valve seat 21 can have a frusto-conical configuration with the smaller end thereof forming the outer end of the valve seat 22.

Figure 2:
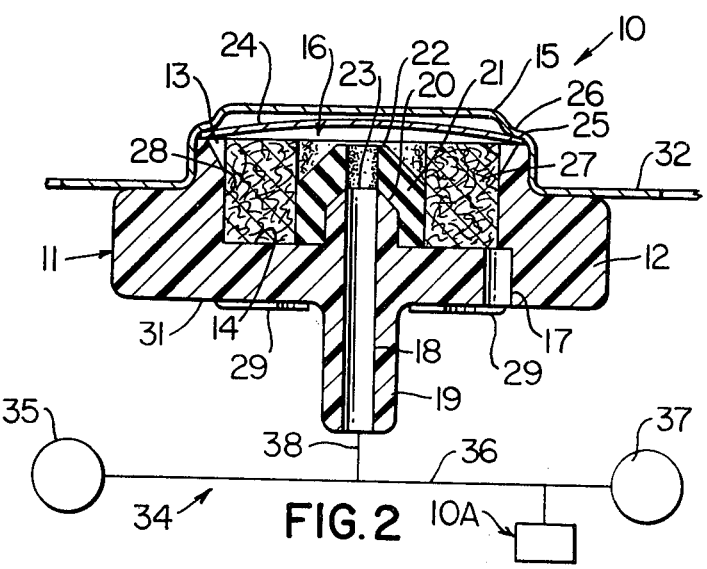
FIG. 2 is an enlarged, cross-section view of the temperature responsive valve consturction of FIG. 1 and is illustrated as being utilized in the improved control system of this invention, FIG. 2 being taken substantially on line 2—2 of FIG. 1.

A bimetallic snap disc 24 has its outer periphery 25 disposed against the open end 13 of the cup-shaped housing member 12 and is held thereagainst by an annular bent portion 26 of the cover member 15 when the cover member 15 is assembled to the cup-shaped housing member 12 in the manner illustrated in FIGS. 1 and 2.

The bimetal member 24 is so constructed and arranged that when the same senses a temperature condition above predetermined temperature, the bimetal member 24 is in bowed configuration illustrated in FIG. 2 wherein the concave side thereof faces the valve seat 22 and is spaced therefrom so as to permit fluid communication between the inlet 17 and the outlet 18 of the valve construction 10. However, when the bimetal member 24 senses a temperature below the predetermined temperature, the bimetal member 24 snaps over center in the manner illustrated in FIG. 3 so that in its snapped condition the convex side of the bimetal member 24 engages against the valve seat 22 to completely close the outlet 18 from the chamber 16 and, thus, from the inlet 17 for a purpose hereinafter described. Conversely, with the valve construction 10 disposed in the condition illustrated in FIG. 3, a subsequent increase in the sensed temperature of the bimetal member 24 will cause the bimetal member 24 to snap back over center from the position illustrated in FIG. 3 back to the position illustrated in FIG. 2 to open the valve seat 22 to interconnect the inlet and outlet 17 and 18 together.

In order to filter the fluid flow between the inlet 17 and outlet 18 of the valve construction 10, an annular member 27 of porous filtering material is disposed in compressed relation about the resilient tubular member 21 which forms the valve seat 22 and the internal peripheral surface 28 of the cup-shaped housing member 12 in the manner illustrated in FIG. 2 so that all fluid flow passing between the valve seat 22 and the inlet 17 must pass through the filtering material 27 for a purpose hereinafter described.

The cover member 15 is so constructed and arranged that the same is provided with a plurality of fingers 29 that extend outwardly from a circular body portion 30 thereof, the fingers 29 being adapted to be bent around the cup-shaped housing member 12 into position against the bottom surface 31 thereof, as illustrated in FIGS. 1 and 2, to not only fasten the cover member 15 to the cup-shaped housing member 12, but to also hold the other peripheral means 25 of the bimetallic member 24 on the open end 13 of the cup-shaped housing member 12. In addition, the circular portion 30 of the cover member 15 is provided with outwardly extending opposed ears 32 respectively having notches 33 formed therein for permitting the valve construction 10 to be readily mounted to any supporting structure by suitable fastening means passing through the notches 33 of the cover member 15 in a manner well known in the art.

From the above description of the temperature responsive valve construction 10 of this invention, it can be seen that the same can be formed in a relatively simple manner and from relatively few parts without requiring auxiliary fastening means or sealing means therefor. For example, the cup-shaped housing member 12 can be formed of molded plastic material, if desired.

Figure 3:
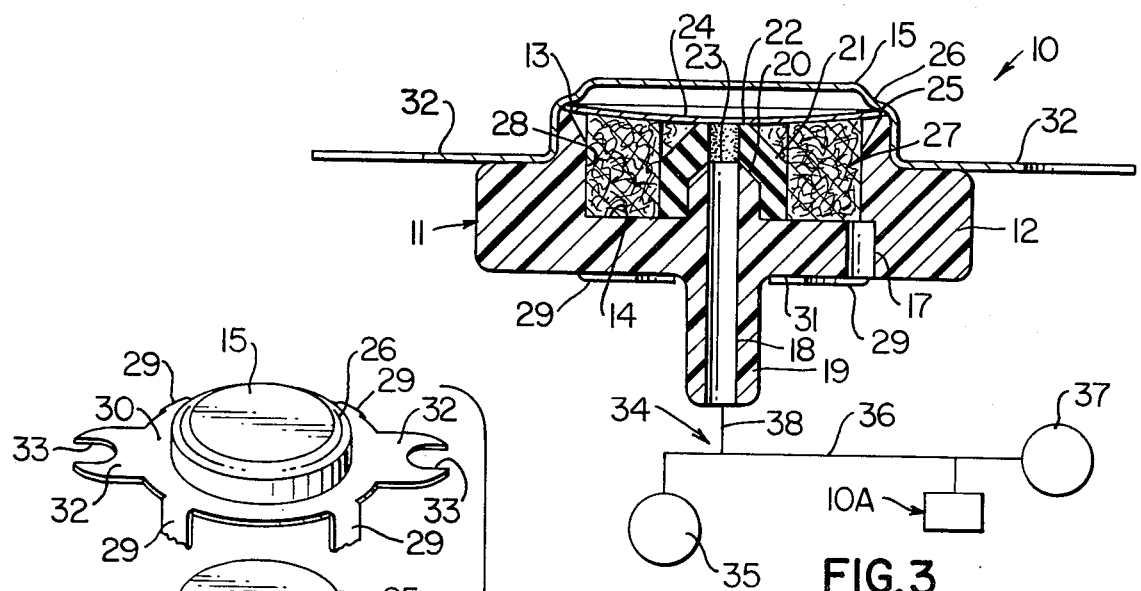
FIG. 3 is a view similar to FIG. 2 and illustrates the temperature responsive valve construction in another operating position thereof.
Figure 4:
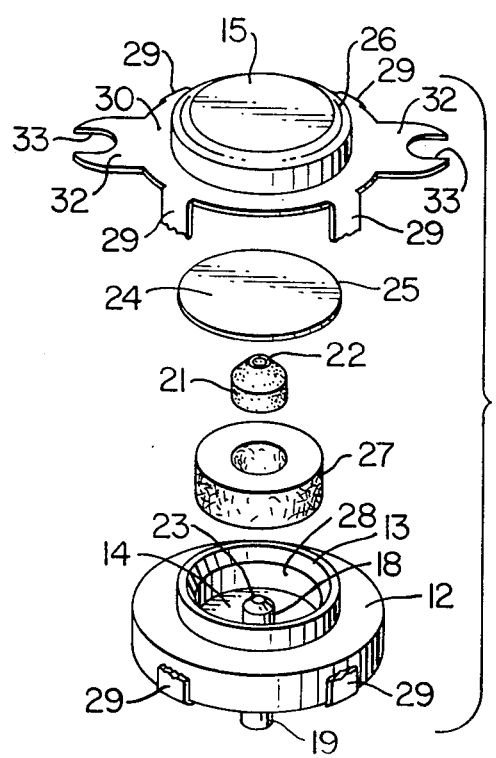
FIG. 4 is an exploded perspective view illustrating the various parts forming the temperature responsive valve construction of FIG. 1.

The temperature responsive valve construction 10 of this invention is adapted to be utilized in the improved pneumatic control system of this invention that is generally indicated by the reference numeral 34 in FIGS. 2 and 3 and now to be described.

As illustrated in FIGS. 2 and 3, a pneumatically operated device 35 is adapted to be interconnected by a passage defining means 36 to a pneumatic source 37, except that the passage defining means 36 is always disposed in fluid communication with the outlet 18 of the valve construction 10 by a branch passage means 38. For example, the passage defining means 36 can comprise conduit means and the branch passage means 38 can comprise a conduit means telescoped onto the tubular extension 19 of the temperature responsive valve construction 10.

In this manner, even though the pneumatic source 37 is tending to always direct a pneumatic signal to the pneumatically operated device 35 to operate the same, should the temperature responsive valve construction 10 be disposed in the open condition of FIG. 2 because the bimetal member 24 thereof is sensing a temperature above the previously described predetermined temperature, the pneumatically operated device 35 will not be actuated because the passage defining means 36 is fully interconnected to the atmosphere through the inlet 17 of the valve construction 10.

For example, should the pneumatic source 37 be a vacuum source, such as a vacuum pump, such continuously operating vacuum pump 37 cannot evacuate the passage means 36 leading to the vacuum operated device 35 to actuate the same as long as air is adapted to enter the inlet 17 of the temperature responsive valve construction 10 and pass through the opened valve seat 22 thereof and out through the outlet 18 into the passage defining means 36 intermediate the source 37 and the pneumatically operated device 35. However, when the bimetal member 24 senses a temperature below the aforementioned predetermined temperature, the bimetal member 24 snaps over center into the position illustrated in FIG. 3 to close the valve seat 22 whereby the vacuum source 37 can now fully evacuate the vacuum operated actuator 35 to operate the same.

Conversely, should the pneumatic source 37 be a pressure source, such as a continuously operating pressure pump, the same will not be able to pressurize the pneumatically operated actuator 35 to operate the same as along as the passage means 36 is interconnected to the atmosphere through the opened valve construction 10. However, when the bimetal member 24 snaps over center to the position illustrated in FIG. 3 by sensing a temperature below the aforementioned predetermined temperature, the closing of the valve seat 20 permits the pressure source 37 to fully pressurize the actuator 35 to operate the same.

Therefore, it can be seen that the temperature responsive valve construction 10 of this invention will prevent actuation of the actuator 35 as long as the same is sensing a temperature above the predetermined temperature and is, therefore, maintaining the valve seat 22 of the valve construction 10 in an open condition thereof. However, when the temperature responsive valve construction 10 is sensing a temperature below the predetermined temperature, the bimetal member 24 is maintaining the valve seat 22 closed so that the pneumatic source 37 can operate the pneumatically operated actuator 35.

However, while the control system 34 previously described has been described as operating in a manner to open the valve seat 22 when the same senses a temperature above a predetermined temperature, it is to be understood that the bimetal member 24 could be so constructed and arranged that the same will only open the valve seat 22 when the same senses a temperature below a predetermined temperature, if desired.

Also, it is to be understood that more than the one valve construction 10 of this invention can be provided in the control system 34 so as to be disposed in fluid communication with the passage means 36 intermediate the pneumatic source 37 in the pneumatically operated device 35. For example, another such temperature responsive device is generally indicated by the reference numeral 10A in FIG. 2 and can comprise a safety high limit temperature sensor that will interconnect the passage means 36 to the atmosphere, and thereby deactivate the actuator 35, when the sensor 10A senses an unsafe temperature.

Therefore, it can be seen that this invention not only provides an improved pneumatic control system, but also this invention provides an improved temperature responsive valve construction having many novel and unique features.

I CLAIM:

1. A temperature responsive valve construction comprising a housing means having an inlet and an outlet formed therein, said housing means carrying a resilient valve seat that is adapted to interconnect said inlet with said outlet when said valve seat is open, and a one-piece bimetal snap disc having an outer periphery and a central portion integral with said outer periphery, said disc having a substantially uniform cross-sectional thickness throughout its central portion and its outer periphery, said bimetal snap disc having its outer periphery carried by said housing means and having its central portion disposed on one side of said valve seat, said snap disc closing said valve seat by having only its uniformed cross-sectioned central portion snapping directly against said valve seat when sensing a certain temperature and opening said valve seat by having its central portion snapping away from said valve seat when sensing another temperature.

2. A temperature responsive valve construction comprising a housing means having an inlet and an outlet formed therein, said housing means carrying a resilient valve seat that is adapted to interconnect said inlet with said outlet when said valve seat is open, and a one-piece bimetal snap disc having an outer periphery and a central portion integral with said outer periphery, said disc having a substantially uniform cross-sectional thickness throughout its central portion and its outer periphery, said bimetal snap disc having its outer periphery carried by said housing means and having its central portion disposed on one side of said valve seat, said snap disc closing said valve seat by having only its uniformed cross-sectioned central portion snapping directly against said valve seat when sensing a certain temperature and opening said valve seat by having its central portion snapping away from said valve seat when sensing another temperature, a filter means carried by said housing means and disposed between said valve seat and one of said inlet and said outlet to filter fluid flow between said inlet and said outlet when said valve seat is open, said housing means comprising a cup-shaped member having an open end and a closed end, said inlet and said outlet being formed in said closed end of said cup-shaped member, said valve seat projecting from said closed end of said cup-shaped member toward said open end thereof.

3. A temperature responsive valve construction as set forth in claim 2 wherein said bimetal snap disc has its outer periphery disposed against said open end of said cup-shaped member.

4. A temperature responsive valve construction as set forth in claim 3 wherein said housing means comprises a cover member secured to said cup-shaped member and confining said bimetal snap disc on said open end thereof.

5. A temperature responsive valve construction as set forth in claim 4 wherein said cover member has fingers bent around said cup-shaped member to secure said cover member and said cup-shaped member together.

6. A temperature responsive valve construction as set forth in claim 2 wherein said valve seat comprises an integral nipple extension projecting from said closed end of said cup-shaped member and a resilient tubular member disposed about said nipple extension and extending beyond the same.

7. A control system comprising a pneumatic source, a pneumatically operated device, passage defining means interconnecting said pneumatic source to said pneumatically operated device, and a temperature responsive valve construction having a housing means provided with an inlet and an outlet, said housing means carrying a resilient valve seat that is adapted to interconnect said inlet with said outlet when said valve seat is open, means interconnecting one of said inlet and said outlet to said passage means intermediate said pneumatic source and said pneumatically operated device, the other of said inlet and said outlet being interconnected to the atmosphere, said valve construction having a one-piece bimetal snap disc provided with an outer periphery and a central portion integral with said outer periphery, said disc having a substantially uniform cross-sectional thickness throughout its central portion and its outer periphery, said bimetal snap disc having its outer periphery carried by said housing means and having its central portion disposed on one side of said valve seat, said snap disc closing said valve seat by having only its uniformed cross-sectioned central portion snapping directly against said valve seat when sensing a certain condition whereby said pneumatic source is effectively interconnected to said pneumatically operated device, said snap disc opening said valve seat by having its central portion snapping away from said valve seat when sensing another temperature to effectively interconnect said pneumatically operated device to the atmosphere.

8. A control system as set forth in claim 7 wherein another temperature responsive valve construction similar to said first-named valve construction has one of its said inlet and said outlet interconnected to said passage means intermediate said source and said device.

9. A control system as set forth in claim 7 wherein said source is a vacuum source and said pneumatically operated device is a vacuum actuator.

10. A control system comprising a pneumatic source, a pneumatically operated device, passage defining means interconnecting said pneumatic source to said pneumatically operated device, and a temperature responsive valve construction having a housing means provided with an inlet and an outlet, said housing means carrying a resilient valve seat that is adapted to interconnect said inlet with said outlet when said valve seat is open, means interconnecting one of said inlet and said outlet to said passage means intermediate said pneumatic source and said pneumatically operated device, the other of said inlet and said outlet being interconnected to the atmosphere, said valve construction having a one-piece bimetal snap disc provided with an outer periphery and a central portion integral with said outer periphery, said disc having a substantially uniform cross-sectional thickness throughout its central portion and its outer periphery, said bimetal snap disc having its outer periphery carried by said housing means and having its central portion disposed on one side of said valve seat, said snap disc closing said valve seat by having only its uniformed cross-sectioned central portion snapping directly against said valve seat when sensing a certain condition whereby said pneumatic source is effectively interconnected to said pneumatically operated device, said snap disc opening said valve seat by having its central portion snapping away from said valve seat when sensing another temperature to effectively interconnect said pneumatically operated device to the atmosphere, a filter means carried by said housing means and disposed between said valve seat and one of said inlet and said outlet to filter fluid flow between said inlet and said outlet when said valve seat is open, said housing means comprising a cup-shaped member having an open end and a closed end, said inlet and said outlet being formed in said closed end of said cup-shaped member, said valve seat projecting from said closed end of said cup-shaped member toward said open end thereof.

11. A control system as set forth in claim 10 wherein said bimetal snap disc has its outer periphery disposed against said open end of said cup-shaped member.

12. A control system as set forth in claim 11 wherein said housing means comprises a cover member secured to said cup-shaped member and confining said bimetal snap disc on said open end thereof.

13. A control system as set forth in claim 12 wherein said cover member has fingers bent around said cup-shaped member to secure said cover member and said cup-shaped member together.

14. A control system as set forth in claim 10 wherein said valve seat comprises an integral nipple extension projecting from said closed end of said cup-shaped member and a resilient tubular member disposed about said nipple extension and extending beyond the same.

* * * * *